A. E. REUSS & O. SCHNITZLER.
GEARING
APPLICATION FILED MAY 17, 1911.

1,034,146. Patented July 30, 1912.

A. E. REUSS & O. SCHNITZLER.
GEARING.
APPLICATION FILED MAY 17, 1911.

1,034,146.

Patented July 30, 1912.

Witnesses:
Jacob A. Hollander
Bertha Herbsleb

Inventors:
Arthur E. Reuss
Oscar Schnitzler
by A. F. Herbsleb, Their Attorney

UNITED STATES PATENT OFFICE.

ARTHUR E. REUSS, OF CINCINNATI, AND OSCAR SCHNITZLER, OF REMINGTON, OHIO.

GEARING.

1,034,146.   Specification of Letters Patent.   Patented July 30, 1912.

Application filed May 17, 1911. Serial No. 627,805.

*To all whom it may concern:*

Be it known that we, ARTHUR E. REUSS and OSCAR SCHNITZLER, citizens of the United States, residing, respectively, in Cincinnati and at Remington, in the county of Hamilton and State of Ohio, have jointly invented certain new and useful Improvements in Gearing, of which the following is a specification.
Our invention relates to gearing, and has for its object the provision of novel means whereby change of relation in speed changing mechanism may be automatically effected, further to provide means whereby speed changing mechanism may be automatically acted on electrically in changing speed, further to provide means embracing a movable member acted on by opposing lines of force and electric controlling means for speed transmission embracing a circuit or circuits affected by said movable member, further to provide means embracing speed changing mechanism and clutch mechanism, one or both of which is arranged to be automatically controlled by a moving member acted on by opposing lines of force, further to provide novel means whereby the relations in the speed changing means are changed, further to provide novel means whereby the changing movements are initiated automatically by electric controlling means, further to provide novel means for automatically affecting said electric controlling means, and further to provide novel means whereby said electric controlling means initiate movements for speed change and mechanically actuated means complete said movements.

It is the object of our invention further, to provide a floating mechanism which is acted on by the opposing lines of force in power transmission for controlling electric means whereby speed change is effected, further to provide floating mechanism acted on by opposing lines of force in power transmission and having auxiliary resistance means acting thereon, with speed changing means in which change of speed is initiated by electric means automatically acted on by said floating mechanism, and further to provide means whereby clutch mechanism is controlled in manners above stated.

Our invention is particularly applicable in such relations where conditions arise similar to those in the propulsion of automobiles or motor driven vehicles, in which various resistances to propulsion owing to conditions or grades of road or other causes are encountered, requiring various changes of speed of travel or power application, which have heretofore been manually effected, and which in our improved device are effected automatically.

We have shown and described our invention in connection with a power transmission mechanism such as is employed for instance, in automobiles, although we do not limit ourselves to such application of our invention.

In the present exemplification of our invention, the line of resistance force is primarily employed for effecting change in relation in the speed changing mechanism or in the clutch mechanism, or both, although we do not limit ourselves to this condition.

Our invention, employing two opposing lines of force acting on a moving member, and others of the features herein shown and described, are broadly claimed in a copending application filed by us May 1, 1911, Serial No. 624,294, to which reference is here made, and in which another exemplification of our invention is shown, described and claimed.

The invention will be further readily understood from the following description and claims, and from the drawings, in which latter:

Figure 1:
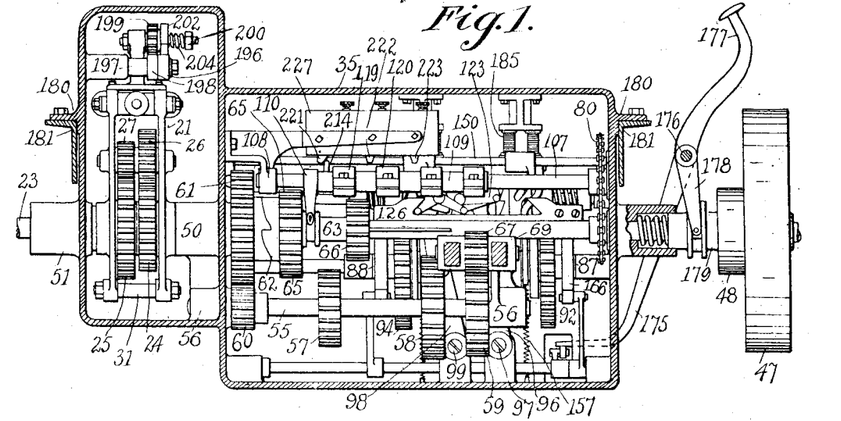
Figure 1 is a side elevation of our improved device, with the front of the casing removed.
Figure 2:
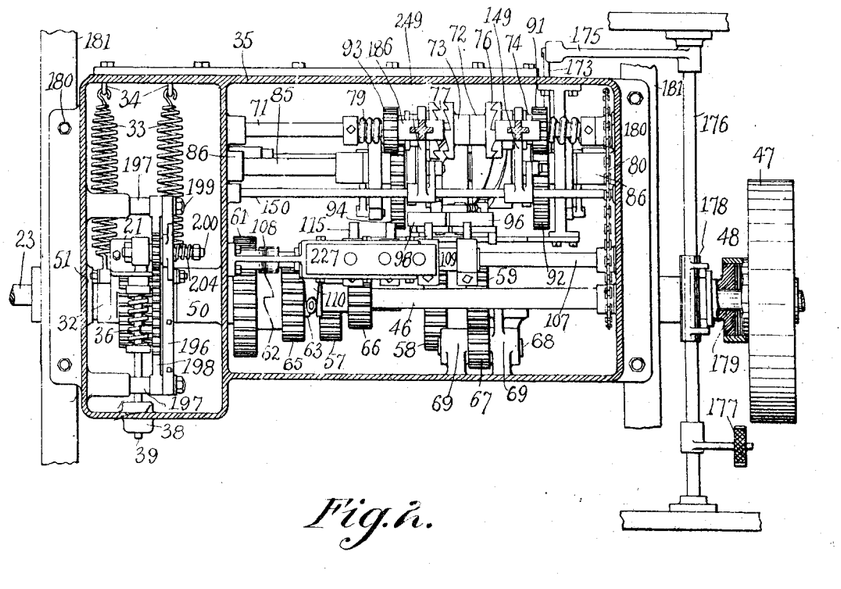
Fig. 2 is a plan view of the same, with the top of the casing removed.
Figure 3:
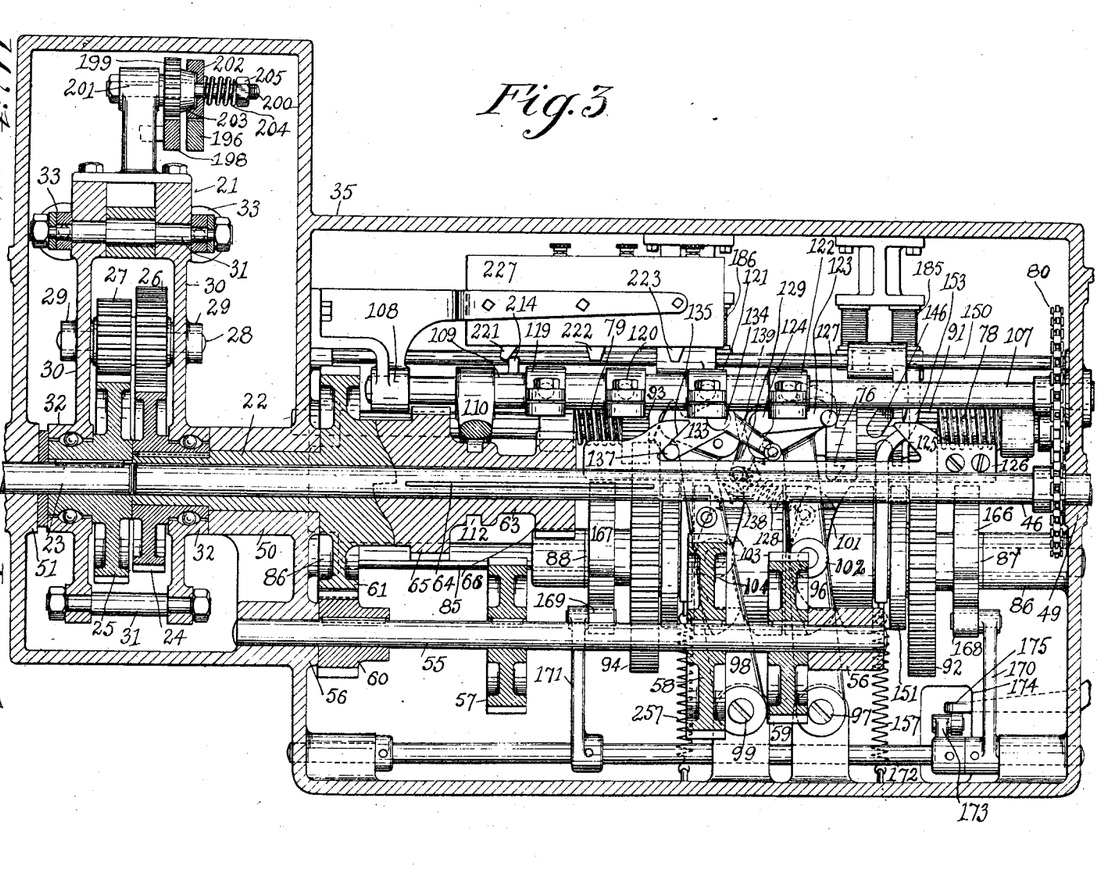
Fig. 3 is an irregular section taken on the line z—z of Fig. 5, showing the parts in side elevation and partly in section.
Figure 4:
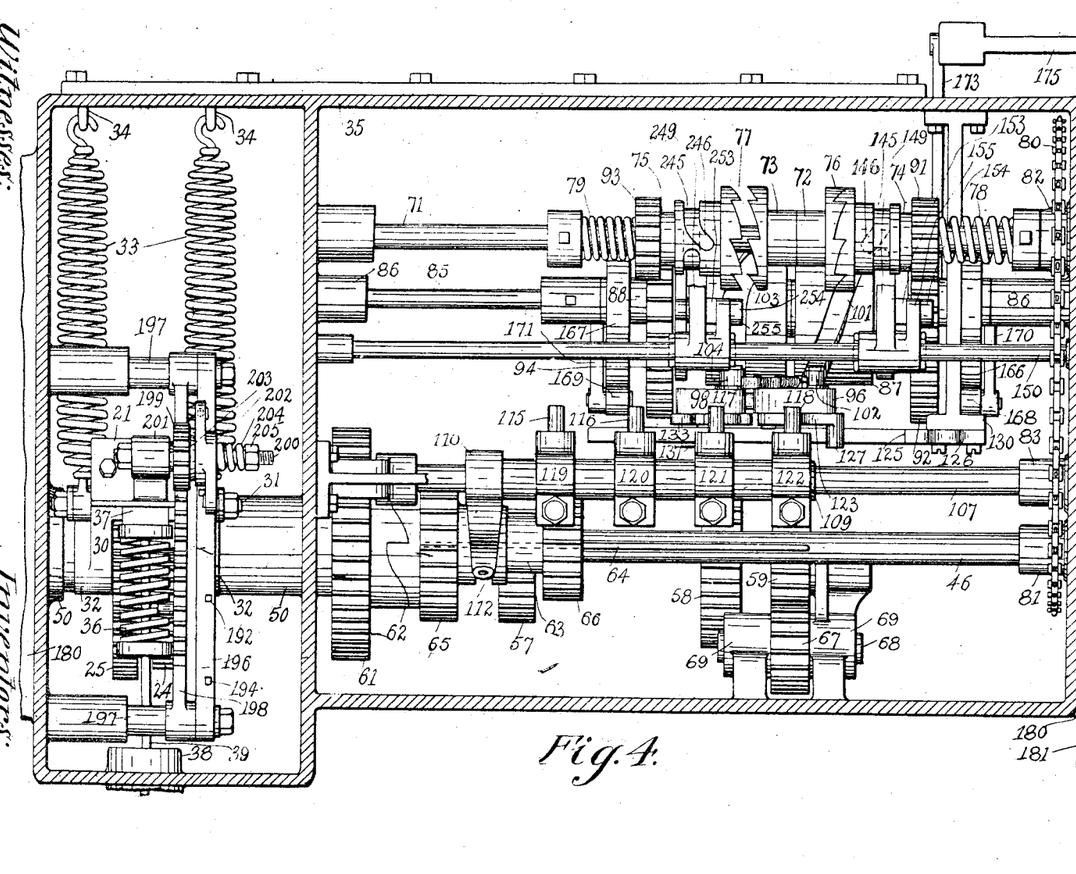
Fig. 4 is an enlarged plan view with the top of the casing removed and part of the upper portions of the mechanism broken away for better illustration of parts.
Figure 5:
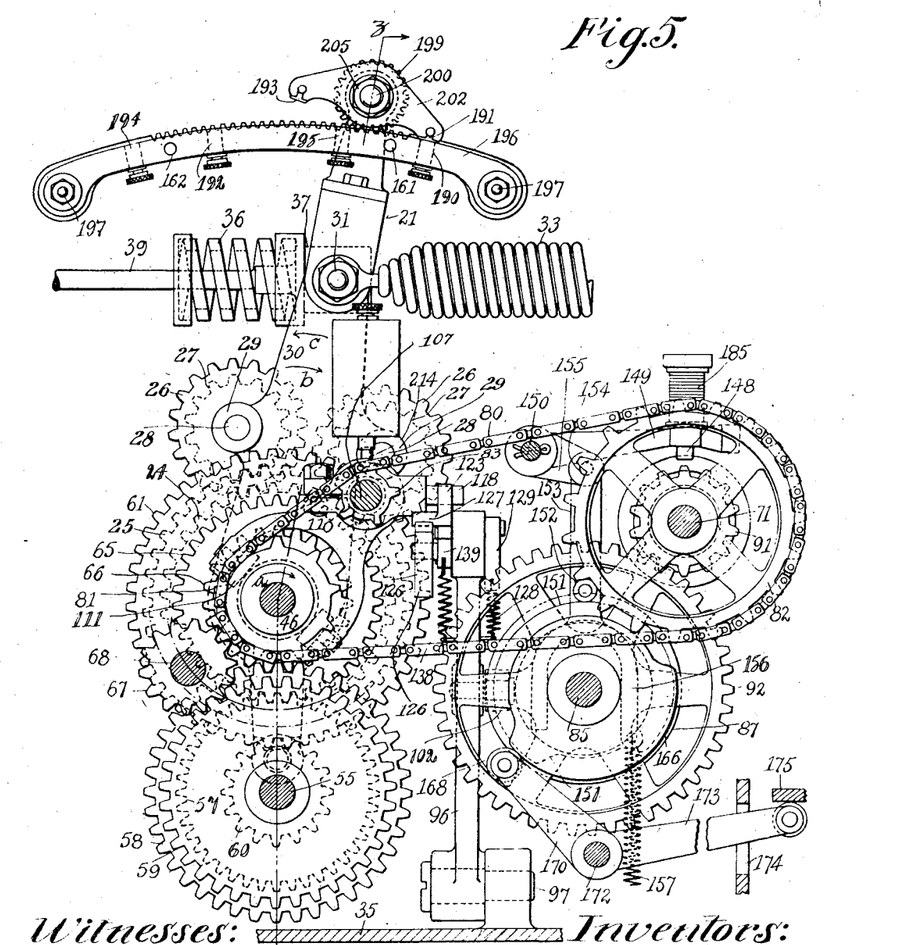
Fig. 5 is an enlarged detail of the mechanism with the casing almost entirely removed for better illustration of the assembled mechanism and with the parts partly broken away; and, Fig. 6 is a diagrammatic representation of the electrical connections.
Figure 6:
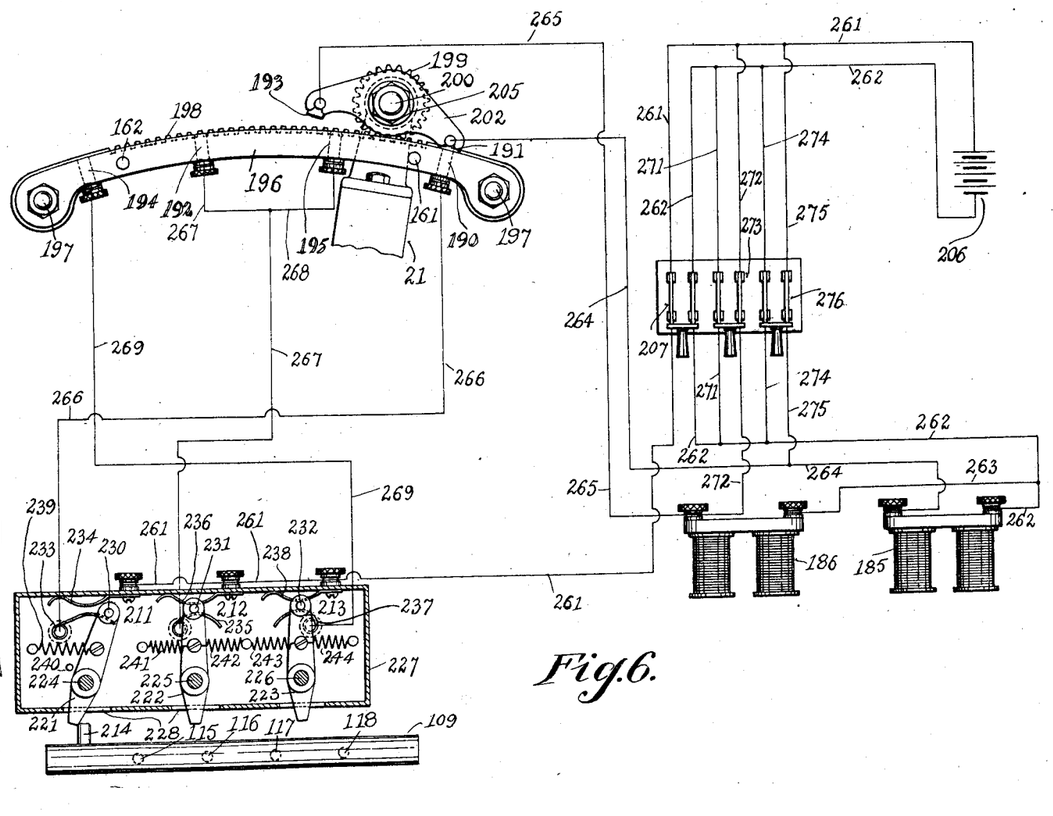

21 represents a floating member, shown as a vibrator-frame, interposed between the driving element and the driven element, represented in the present exemplification respectively by a driving shaft 22 and a driven shaft 23, shown as arranged end to end, the driving shaft being shown as a hollow shaft. There is a train of transmitting mechanism between said shafts, part of which is mounted on said vibrator-frame, this train of mechanism being represented as a train of gearing comprising a pair of gears 24, 25 arranged end to end, and transmitting gears 26, 27 having axles 28 mounted in bearings 29 in the respective arms 30 of said vibrator-frame, the said arms being connected adjacent their outer ends by tie-bolts 31. The vibrator-frame is shown as a pivoted frame whose axis of oscillation or swing is coincident with the axes of rotation of the gears 24, 25, and the said axes of rotation and axis of oscillation or swing may also be coincident with the axes of rotation of the driving and driven shafts. In the form shown the vibrator-arms have bearings 32 about the hubs of the gears 24, 25. The transmitting gears 26, 27 are respectively shown in pairs for increasing the transmitting powers of the mechanism.

The vibrator-frame with the gears thereon, in the exemplification shown, act as planetary members under the influence respectively of the driving force imparted by the driving shaft and the reacting driven force of the driven element induced for instance by the tractive resistance of the vehicle-wheels, the overbalancing of the forces causing the vibrator-frame to move in opposite directions. These movements may take place assisted by or counteracted by the action of auxiliary resistance means, as a spring or springs, of which two sets are shown, one set being a pair of extensible springs 33 articulated to the vibrator-frame on one of said tie-bolts and held to stationary parts, as to lugs 34 of a casing 35, shown as an inclosing box. There may be a further spring 36, shown as a compression spring, which is active for preferably but a part of the range of movement of the vibrator-frame. One end of the latter spring is shown received against a block 37 received about said tie-bolt, movement of the other end thereof being limited, as by a stationary part, shown as a bearing 38 in which a guide-rod 39 for the spring slides.

The driving element may be acted on by suitable speed changing mechanism, in connection with which we have provided automatic means for changing the speed thereof. We have exemplified the speed changing mechanism as comprising a pair of shafts with gears therebetween, although it is obvious that other characters of speed changing mechanism may be employed. We have preferred however to illustrate the sliding-gear and clutch form of speed changing mechanism as convenient in illustrating our invention. Thus 46 is a power shaft driven by a suitable motor, as an internal combustion motor, the fly-wheel of which is shown at 47. A usual style of drive-clutch is operatively interposed between the motor and the power-shaft, as for instance the well-known disk friction clutch employed in automobiles, and indicated at 48. The power-shaft is shown journaled in a bearing 49 in the casing and in the hollow drive-shaft, the latter being journaled in a bearing 50 in the casing. A bearing 51 is also shown in the casing in which the driven shaft is journaled.

55 represents an intermediate shaft journaled in bearings 56 in the main frame or casing and which may have thereon transmitting gears 57 58 and 59, and a transmitting pinion 60 which meshes with a gear 61 on the drive-shaft, having thereon also one of the faces of a clutch 62, the other face whereof is on a sleeve 63 having spline-connection 64 with said power-shaft, the said sleeve being provided with gears 65 66.

67 is a transmitting gear which meshes with the gear 59. It is mounted on a stud 68 journaled in bearings 69 of the main frame.

Longitudinal movement is imparted to the sleeve 63 whereby the clutch 62 is engaged for imparting high speed to the driving element, or the gear 65 may be brought into mesh with the gear 57 for imparting intermediate speed to said driving element through the intermediate shaft, or the gears 66 and 58 may be brought into mesh for transmitting low speed to said driving element, or the gear 66 may be brought into mesh with the transmitting gear 67 for causing reversal of movement of the driving element through said transmitting gear and the gear 59. The numbers of speeds and the reversal are instanced merely as examples and not as limitations of the scope of our invention. The movement of the sleeve 63 is preferably accomplished automatically, and we prefer to initiate the changes in the gearing by electrical means, instancing the same as electro-magnetic apparatus.

71 is a clutch-shaft to which a pair of clutch-sleeves 72 73 is secured. Cam-sleeves 74 75 are loose on the clutch-shaft, clutches 76 77 being located between said respective cam-sleeves and clutch-sleeves, the cam-sleeves being normally urged toward the clutch-sleeves by springs 78 79. The clutch-shaft is normally rotated, as by means of a sprocket-chain 80 received about sprocket-wheels 81 82 respectively on the power-shaft and the clutch-shaft and an idler sprocket-wheel 83.

85 is a cam-shaft located in bearings 86 on the frame and has thereon cam-hubs 87 88. The cam-sleeve 74 has a pinion 91 thereon which meshes with a gear 92 on the cam-hub 87, for driving the latter, for instance, with a speed of three to one. The cam-sleeve 75 has a pinion 93 thereon which meshes with a gear 94 on the cam-hub 88, for driving the latter with a similar speed.

The cam-hubs 87 88 are respectively rotated when the clutches 76 77 are respectively in engagement, the operation in the exemplification being such that, when the progression takes place from a lower to a higher speed, one of said clutches operates, whereas succession from a higher to a lower speed is accomplished through the medium of the other of said clutches. The manner of engaging the clutches will be hereinafter described.

96 is an arm pivoted at 97 to the frame, and 98 is an arm pivoted at 99 to the frame. The cam-hub 87 is provided with a cam-groove 101, with the walls of which an engaging part, shown as a roller 102 on the arm 96 is adapted to make contact. The cam-hub 88 is provided with a cam-groove 103, with the walls of which an engaging part, shown as a roller 104, on the arm 98 is adapted to make engagement for operating said arm.

107 is a shaft fixed in bearings 108 of the frame and has on it a sleeve 109 which slides longitudinally thereon, the sleeve being provided with a fork 110 provided with shoes 111 received in an annular groove 112 of the sleeve 63 for moving said sleeve longitudinally. The longitudinal movement of the sleeve 109 is accomplished by the arms 96 98, one of said arms acting to move said sleeve in one direction and the other of said arms acting to move said sleeve in the opposite direction. The longitudinally movable sleeve 109 is provided with a series of contact parts, shown as pins 115 116 117 and 118 on the clamp bearings 119 120 121 and 122, by means of which the said pins are secured to the sleeve.

123 is a trigger pivoted to the arm 96 on a pivot 124 adapted to engage the respective pins on the slidable sleeve for moving the sleeve in one direction. A keeper-face 125 on a keeper-bar 126 is adapted to engage a pin 127 on the trigger in the return movement of said arm for retracting said trigger and for normally holding said trigger in retracted position when said arm is in normal position. The keeper-bar is secured to the frame, as to a bracket 130. A spring 128 is secured between the arm and a tail-piece 129 on said trigger and normally urges said trigger into engaging position with said sleeve-pins.

The arm 98 is provided with a trigger 133 pivoted thereto on a pivot 134, the trigger being arranged to make engagement with the pins on the longitudinally slidable pin-sleeve for imparting movement to said sleeve in the opposite direction, the trigger being provided with a pin 137 adapted to engage a keeper-face 135 on the keeper-bar 126 on retractive movement of the arm for retracting said trigger. The trigger is normally urged into engaging position with the sleeve-pins by a spring 138 secured between the arm and a tail-piece 139 of the trigger.

The cam-sleeve 74 is provided with a cam-groove 145 which is preferably annular for its major portion and has an offset portion 146, a pin 148 located on an arm 149 pivoted about a shaft 150 being adapted to be received in said groove, normally resting in said diagonal portion for causing release of the clutch 76. When the pin is retracted, the clutch 76 will come into engagement under influence of the spring 78, and through the medium of the gears 91 92 cause rotation of the cam-hub 87 for causing movement of the arm 96. During the initial part of this movement the keeper-pin 127 on the trigger will be released from the keeper 125 and the trigger will then engage the pin on the longitudinally movable sleeve 109 which is in its range of movement, the arm in its movement moving said longitudinally movable pin-sleeve and the sleeve 63 through the range of a step of movement. The clutch-sleeve will continue its rotations until the pin 148 is reëngaged with the cam-groove 145. In order to maintain disengagement between said pin and said cam-groove, we provide the cam-hub 87 with a cam 151, which engages a roller 152 on a link 153 articulated at 154 with an arm 155 rigid with the arm 149, and having a fork 156 straddling said cam-hub for causing proper operation of the parts, a spring 157 normally urging engagement between the roller 152 and the cam 151, the cam 151 being so constructed as to maintain the pin 148 out of its cam-groove until the final portion of the revolution of the cam-sleeve 74, when reengagement is permitted between said pin and the cam-groove for again causing disengagement of the clutch 76, thus giving additional time for the movement of the speed changing parts. In the meantime the arm 96 will have been retracted to its initial position by the operation of the cam 101. Similar mechanism is provided for causing movement of the cam-hub 88 and for operating the arm 98, designated by similar reference numerals advanced to the series 200.

In the drawings the parts are shown in the relations which they would assume when the speed is being changed from intermediate to high speed, with the high-speed clutch in engagement and the arm 96 about to be retracted. It is assumed that the power-shaft rotates in the direction of the arrow $a$. The power applying force normally tends to move the vibrator-frame in the direction of the arrow $b$, and the line of resistance force tends to move the vibrator-frame in the direction of the arrow $c$. The line of driving force is preferably amplified by the springs that act on the vibrator-frame. Movement of the vibrator-frame is preferably limited in both directions as by the stops 161 162. If the line of driving force, amplified by the springs when employed, is greater than the line of resistance force, the vibrator-frame will move in the direction of the arrow $b$, and if the line of resistance force is greater than the line of driving force, amplified by the springs when these are employed, the movement of the vibrator-frame or floating member will be in the direction of the arrow $c$. The degree of preponderance of the respective forces will determine the position of the floating member or vibrator-frame, and consequently the speed being transmitted.

It is advisable that when change in speed is being effected that the drive-clutch shall be temporarily released, which we effect in novel manner. Thus the cam-hubs are provided respectively with cams 166 167 engaged by rollers 168 169 on arms 170 171 secured to a rock-shaft 172, from which an arm 173 extends, as through a slot 174 in the casing. This arm makes contact with an arm 175 secured to a rock-shaft 176 to which a usual clutch-operating foot-treadle 177 may also be secured. The rock-shaft 176 has a fork 178 rigid thereon for operating engagement of the clutch 76 and the clutch 48. The casing may be suitably supported as by means of brackets 180 mounted on cross-beams 181 which may be part of the chassis of the motor-vehicle.

The resistance of the auxiliary resisting device shown as the springs 33 36 preferably increases as the arm recedes from its position for inducing high speed and approaches its position for inducing low speed. We accomplish this preferably by causing extension of the springs 33 during the first part of movement of the vibrator-frame and amplify such resistance by the action of the spring 36 at the last part of said movement.

We prefer to operate the arms 149 249 by electro-magnetic means for initiating the movement in the changing mechanism. For this purpose we prefer to provide electro-magnets 185 186, one of which acts for causing engagement of the clutch 76 and the other of which acts for causing engagement of the clutch 77, one of the said magnets preferably initiating increasing speed ratios and the other initiating decreasing speed ratios in said speed changing mechanism, and we have provided means by which these changes may be effected automatically dependent on the power applied or fuel supplied in proportion to the resistance encountered, as in the travel of the vehicle, it being understood that two lines of force, namely, power applying and power resisting lines of force, act upon the vibrator-frame. We provide the vibrator-frame with suitable contacts by which a circuit or circuits may be operatively affected, preferably by closing a circuit or circuits through the magnets for energizing the same and thereby initiating the operation of the speed changing device, and, in the present exemplification, also initiating the operation of the clutch mechanism. Exemplifying these electric connections as applied to the range of changes of speed illustrated in the present exemplification, we provide an electric contact 190 with which an electric contact 191 on the vibrator-frame is arranged to make contact, when it is desired to initiate the high speed transmission of the speed changing device. 192 is an electric contact with which an electric contact 193 on said vibrator-frame is arranged to make contact when it is desired to change from high to intermediate speed, and 194 is an electric contact with which said contact 193 on said vibrator-frame, is arranged to make engagement when the change is made from intermediate to a low speed ratio of gearing. If a change is made from a low speed to an intermediate speed ratio of gearing, the electric contact 191 is arranged to make a contact with a contact 195, the said contact 191 in a further increasing ratio of speed making contact with the contact 190. In order to cause these contacts to be made in proper sequence, we prefer to maintain the contacts 190 192 194 and 195 on an arc-piece 196, preferably of insulation, supported on the casing between rods 197, between which there is secured also a segmental rack 198, the segmental rack engaging a pinion 199 on a bolt 200 passing through a bearing 201 on said vibrator-frame, a rocker-bar 202 being pivoted about said bolt, there being a friction-clutch 203 between said pinion and rocker-bar. A spring 204 received about said bolt between said rocker-bar and a nut 205 normally urges engagement between the friction-faces of said friction-clutch for normally urging swinging of said rocker-bar with said pinion but permitting the contacts 191 193 on said rocker-bar to ride upon said arc-piece. The contacts 191 193 are spaced apart a greater distance than the spaces between the contacts 190 and 195 and the contacts 192 and 194, so that the sequence of the contacts between the contacts of said rocker-bar and the contacts on said arc-piece will be the contacts 190 192 and 194 when said vibrator-frame moves in one direction, and the contacts 194 195 and 190 when said vibrator-frame moves in the opposite direction. In the exemplification shown there are three speeds and two changes made in the movement of the vibrator-frame throughout its complete range of movement in each direction. In the movement in one direction the contact 193 on the vibrator-frame engages the contacts 192 and 194 on the arc-piece and acts in conjunction with the electric magnet 186 for energizing the latter. In the opposite movement of the vibrator-frame the contact 191 thereon makes successive contact with the contacts 195 and 190 on the arc-piece for energizing the electric magnet 185.

206 is a suitable source of electricity shown as a battery for energizing the magnets, in the conductors of which a switch 207 is interposed, which may be manually operated for interrupting the circuits communicating with said electro-magnets, and if so operated, the tripping mechanism is rendered inactive for maintaining the gearing at its attained speed ratio. In order to automatically interrupt the circuit, or circuits of said electro-magnets when a change in speed has been effected by the mechanism described, we provide a series of automatically operated switches 211, 212, 213, actuated by a trip 214 shown mounted on the longitudinally movable sleeve 109.

The automatic switches are so arranged that when a change in speed transmission has been effected, the circuit initiating such change will be interrupted and remain interrupted until a further change in speed has been effected, when the automatic switch for the speed from which change has just been made will be closed and the automatic switch for the speed attained will be opened. The object for maintaining the automatic switch for the speed attained in open relation is to prevent repeated energizing of the magnet affected. These automatic switches preferably comprise the levers 221, 222 and 223 pivoted on pivots 224, 225 and 226 in a switch-box 227 provided with slots 228 through which the ends of the levers project into range of the trip 214. The switches are normally held in closed relations, the levers having thereon electro-conductive contact-pins 230, 231 and 232 received respectively between contacts 233, 234 and 235, 236 and 237, 238, shown as leaf-spring contacts for forming switches respectively for the high speed, intermediate speed and low speed transmissions.

The electro-conductive pins are normally urged into contact between the spring-contacts. This is accomplished in the case of the pin 230 by a spring 239 for urging the lever 221 against a stop 240. In the case of the pin 231 for the intermediate speed transmission, which in practice is arranged to be moved to either side of its position of contact with the contacts 235 236 by the trip 214, the lever 222 is held in intermediate position by means of springs 241, 242. In the case of the pin 232 which is also arranged to be moved to both sides of its spring contacts, when changing either from intermediate to low speed or from low speed to reverse direction of transmission, the lever 223 is held in intermediate position by springs 243 244.

An electric conductor 261 connects the battery 206 with all of the automatic switches 211, 212 and 213. An electric conductor 262 with a branch 263 connects the battery with the electro-magnets 185 and 186. The switch 207 is placed in the conductors 261, 262. An electric conductor 264 connects the terminal 191 with the electro-magnet 185 and an electric conductor 265 connects the terminal 193 with the electro-magnet 186. An electric conductor 266 connects the switch 211 with the terminal 190. An electric conductor 267 and a branch 268 connect the switch 212 with the terminals 192, 195. An electric conductor 269 connects the switch 213 with the terminal 194.

The automatic switches are affected for changing the speeds. If it is desired to effect reversals of movement, this may, in the present exemplification, be accomplished by causing the operation to be initiated through the manually controlled switches, which preferably short circuit the automatic switches which latter may, if desired, be rendered inactive by opening the switch 207. Thus an electric conductor 271 connects the portions of the electric conductor 262 at the respective sides of the switch 207. An electric conductor 272 connects the electric conductor 261 with the magnet 186 from a point in advance of the switch 207. A switch 273 is in the electric conductors 271, 272. An electric conductor 274 connects the portions of the conductor 262 at the respective sides of both of the switches 207 and 273. An electric conductor 275 connects the electric conductor 261 with the electro-magnet 185 from a point in advance of the switch connections for the switches 207, 273. A switch 276 is in the electric conductors 274, 275.

The movements for change of speed from high to intermediate and low speeds and reversal of movement and for changing again to direct movement and low, intermediate and high speeds, take place in sequential order, the movement for change of direction taking place either from or to low speed relations of parts. In each of these changes the clutch mechanism is preferably automatically operated for releasing the drive clutch, there being however sufficient inertia in the parts to effect the change of speed. As stated, the changes in speed are preferably effected automatically, whereas the reversals of movement are preferably controlled by the manually operated switches, the switch 273 controlling the magnet 186 for causing change of movement from low speed to reversal of movement, and the switch 276 controlling the magnet 185 for changing back from reverse drive to direct drive at low speed.

The switches 207, 273 and 276 may be on the dashboard and the battery at a suitable place on the vehicle, the conductors connecting the same with the mechanism inside the casing being suitably disposed and led into the casing to the electric mechanism therein.

The relations of parts in the speed changing mechanism under a given power application, are controlled by the resistances encountered, owing for instance to road conditions or grades of road, and change of relation in the speed changing mechanism is also controlled by the amount of power supplied and may be effected by the mere change of supply of fuel to the motor as fully explained in our aforesaid copending application.

Having thus fully described our invention, what we claim as new, and desire to secure by Letters Patent, is:

1. In speed changing mechanism, the combination of a train of gearing comprising a floating gear-supporting member supporting gearing of said train, and electric controlling means automatically acted on by said floating gear-supporting member for controlling the speed of transmission.

2. In speed changing mechanism, the combination of a train of gearing comprising a floating gear-supporting member supporting gearing of said train, a clutch mechanism, and electric controlling means automatically acted on by said floating gear-supporting member for affecting transmission by said clutch mechanism.

3. In speed changing mechanism, the combination of a train of gearing comprising a floating gear-supporting member supporting gearing of said train, a clutch mechanism, and electric controlling means automatically acted on by said floating gear-supporting member for controlling the speed of transmission and affecting the power transmission through said clutch mechanism.

4. In speed changing mechanism, the combination of a train of gearing comprising a floating gear-supporting member supporting gearing of said train, said floating gear-supporting member acted on by opposed lines of force, power-transmitting elements, means for effecting change of relation in said power-transmitting elements, and electric controlling means coöperating with a portion of said last-named means and embracing an electric circuit or circuits controlled by said floating member.

5. In speed changing mechanism, the combination of a floating member acted on by opposed lines of force, power-transmitting elements, means for effecting change of relation in said power-transmitting elements, electric controlling means coöperating with a portion of said last-named means and embracing an electric circuit or circuits controlled by said floating member, and means affecting said circuit or circuits acted on by an element affected in said change of relation.

6. In speed changing mechanism, the combination of a floating member acted on by opposed lines of force, speed-change elements, means for moving an element of the latter for effecting change of relation therein, and electric controlling means for the latter embracing interrupting means controlled by said floating member, and interrupting means controlled by an element concerned in moving said element of said speed-change elements.

7. In speed changing mechanism, the combination of a floating member acted on by opposed lines of force, speed-change elements, means for moving an element of the latter for effecting change of relation therein, and electric controlling means for the latter embracing interrupting means controlled by said floating member, and interrupting means controlled by an element concerned in moving said element of said speed-change elements, said two named interrupting means acting in opposition for making and breaking said circuits.

8. In speed changing mechanism, the combination of a floating member acted on by opposed lines of force, power-transmitting elements, means for effecting change of relation in said power-transmitting elements, electric controlling means for the latter embracing a plurality of interrupted circuits arranged for being closed by said floating member, and interrupting means for said circuits respectively acted on by an element affected in said change of relation.

9. In speed changing mechanism, the combination of a floating member acted on by opposed lines of force, speed-change and reversing elements, means for operatively effecting change of relation in said elements, and electric controlling means for the latter embracing automatically acting controlling means actuated by said floating member throughout the range of change of relation in said speed-change elements, and optional controlling means for said means operatively effecting change of relation in said reversing elements.

10. The combination of a vibrator-member acted on by opposed lines of force for vibrating the same, gears therefor employed in transmitting power, speed-change elements, means for operating the same, and electric initiating means for the latter having operative connection with said vibrator-member.

11. The combination of a vibrator-member acted on by opposed lines of force for vibrating the same, gears therefor employed in transmitting power, speed-change members, means for operating the same, and electric initiating means for the latter having operative connection with said vibrator-member, said electric initiating means embracing interrupting means actuated by said operating means.

12. In power transmitting mechanism, the combination of a driving element, a driven element, a vibrator-frame acted on by opposed lines of force operatively disposed between said elements, a train of gearing operatively disposed between said elements part of which is located on said vibrator-frame, speed-change members, and operative controlling mechanism for said speed-change members, movement wherein is initiated from said vibrator-frame.

13. The combination of a vibrator-member, gears therefor employed in transmitting power, speed-change members, means for operating the same, and electric initiating means for the latter having operative connection with said vibrator-member, said electric initiating means embracing interrupting means actuated by said operating means, said interrupting means being normally in closed relation.

14. The combination of speed-change parts, a power transmitting clutch, a moving member acted on by opposed lines of force for moving the same, means for changing the speed relation in said speed-change parts, means for operating said clutch, and electric initiating means for said two last-named means comprising an electric circuit controlled by said moving member.

15. The combination of speed-change parts, a power transmitting clutch, a moving member acted on by opposed lines of force for moving the same, means for changing the speed relation in said speed-change parts in increasing and decreasing speed ratios, means for operating said clutch, electric initiating means for said two last-named means comprising a plurality of electric circuits initiating movement in said speed-change parts in opposite directions.

16. In speed changing mechanism, the combination of a train of gearing comprising a floating gear-supporting member supporting gearing of said train, said floating gear-supporting member acted on by opposed lines of force, resistance means for said floating gear-supporting member auxiliary to a line of said force, and electric controlling means acted on by said floating gear-supporting member.

17. In speed changing mechanism, the combination of a train of gearing comprising a floating gear-supporting member supporting gearing of said train, speed-change elements, said floating gear-supporting member acted on by opposed lines of force, resistance means for said floating gear-supporting member auxiliary to a line of said force, means having connection with a part of said speed-change elements for changing the relation therein, and controlling means for the latter acted on by said floating gear-supporting member.

18. In speed changing mechanism, the combination of a train of gearing comprising a floating gear-supporting member supporting gearing of said train, speed-change elements, a power-transmitting clutch, said floating gear-supporting member acted on by opposed lines of force, resistance means for said floating gear-supporting member auxiliary to a line of said force, means having connection with a part of said speed-change elements and said clutch, and controlling means for the latter acted on by said floating gear-supporting member.

19. In speed change mechanism, the combination of a train of gearing comprising a floating gear-supporting member supporting gearing of said train, said floating gear-supporting member acted on by opposed lines of force, speed-change parts, parts concerned in reversal of movement, means for actuating a portion of said parts for effecting change in relation therein, and controlling means for the latter acted on by said floating gear-supporting member.

20. In speed changing mechanism, the combination of a floating member through which the power is transmitted and upon which the opposing lines of force of said power transmission act, speed-change parts, means for causing change of relation therein, and electric controlling means for the latter controlled by said floating member.

21. In speed changing mechanism, the combination of a floating member through which the power is transmitted and upon which the opposing lines of force of said power transmission act, speed-change parts, means for causing change in relation therein, electric controlling means for the latter controlled by said floating member, and auxiliary resistance means for said floating member.

22. In speed changing mechanism, the combination of a floating member through which the power is transmitted and upon which the opposing lines of force of said power transmission act, speed-change parts, means for causing change in relation therein, electric controlling means for the latter controlled by said floating member, and a plurality of auxiliary resistance means for said floating member, part of which act on said floating member during a portion of its movement and all of which act thereon during the balance of its movement.

23. In speed changing mechanism, the combination of speed-change members, means for moving a member thereof a plurality of steps for causing change in relation thereof, an interrupted electric circuit for each of said steps, means for closing each of said circuits, and means actuated by said moving member for breaking said respective closed circuits and maintaining the same in interrupted relation during maintenance of said last-named means in closing position.

24. In speed changing mechanism, the combination of speed-changing members, means for moving a member thereof for causing change in relation thereof, initiating means for the latter embracing a revolving cam and tripping means therefor, and means for maintaining said tripping means out of range of said cam throughout more than a complete revolution of said cam.

25. In speed changing mechanism, the combination of a power element, a driving element and a driven element, speed-change parts between said power element and said driving element, a floating member between said driving and driven elements controlled by the opposed lines of force therefrom, means for moving a member of said speed-change parts for effecting speed-change thereof comprising cam-mechanism having operative relation with said movable member and clutch-mechanism having operative relation with one of said first-named elements, and means automatically operating said clutch having operative relation with said floating member for operating the same.

26. In speed changing mechanism, the combination of speed-change parts for transmitting a plurality of speeds, means for causing change in relation of said parts respectively in increasing or decreasing speed changing ratios comprising moving means and a plurality of cam-mechanisms for actuating said last-named means respectively in opposite directions, and means for initiating movement in said respective cam-mechanisms.

27. In speed changing mechanism, the combination of speed-change members, means effecting operative movement therein for causing speed change comprising a movable member, an arm and trigger mechanism between said movable member and arm.

28. In speed changing mechanism, the combination of speed-change members, means effecting operative movement therein in opposite directions for causing speed change comprising a movable member, a plurality of arms movable in opposite directions and trigger mechanisms between said arms and movable member.

29. In speed changing mechanism, the combination of speed-change members, means effecting operative movement therein for causing speed change comprising a movable member, an arm, trigger mechanism between said arm and movable member, and releasing mechanism for said trigger mechanism operative upon retraction of said arm.

30. In speed changing mechanism, the combination of speed-change members, means for moving a member thereof for causing change in relation thereof comprising a pair of arms movable in opposite directions, trigger means between said movable member and arms, springs for normally urging the triggers of said trigger means into operative relation, and means for retracting said triggers upon retraction of said arms.

31. In speed changing mechanism, the combination of speed-change members, means for moving a member thereof for causing change in relation thereof comprising a longitudinally moving member, a pair of oppositely movable arms for moving said movable member in opposite directions, trigger mechanism between each of said arms and said longitudinally movable member, and means for retracting the triggers of said trigger mechanisms out of operative range of said longitudinally movable member upon retraction of said respective arms.

32. In speed changing mechanism, the combination of speed-change members, means for moving a member thereof for causing change in relation thereof comprising a movable member, a pair of arms movable in opposite directions for shifting said movable member in opposite directions, cam-mechanism for each of said arms for operating the same, and means for automatically operating said cam-mechanism.

33. In speed changing mechanism, the combination of speed-change members, means for moving a member thereof for causing change in relation thereof comprising cam-mechanism and initiating means for the latter embracing a clutch, a cam-device, electrically operated mechanism for causing engagement between said clutch and cam-device, and operative connecting means between said cam-device and cam-mechanism, substantially as described.

34. In speed changing mechanism, the combination of speed-change members embracing a movable member for causing change in relation thereof, operating means for the latter embracing a cam, a tripper-cam, and an electrically operated trip therefor.

35. In speed changing mechanism, the combination of speed-change members embracing a movable member for causing change in relation thereof, operating means for the latter embracing a cam, a tripper-cam, an electrically operated trip therefor, means for rotating said second-named cam at greater speed than said first-named cam, and means having connection with said second-named cam for maintaining said trip out of operative relation with said second-named cam throughout more than a complete revolution thereof.

36. In speed changing mechanism, the combination of speed-change and reverse members embracing a movable member for causing change in relation thereof, a plurality of arms movable in opposite directions having operative connection with said movable member for causing movement thereof in reverse directions, cams for operating the latter, clutch-members, cams therefor, means for releasing said last-named cams for causing engagement with said clutch-members and thereby operating said first-named cams, and means for permitting a revolution of said first-named cams for a plurality of revolutions for said second-named cams.

37. In speed changing mechanism, the combination of speed-change members comprising a movable member for causing change in relation thereof, a cam for moving the same, an initiating cam, tripper means therefor, means for maintaining said tripper means in disengaged relation, comprising a third cam fast with said first-named cam, said first-named and second-named cams having operative connection for rotating said second-named cam a plurality of times for each revolution of said first-named cam.

38. In speed changing mechanism, the combination of speed-change members comprising a movable member for causing change in relation thereof, a cam for moving the same, an initiating cam, tripper means therefor, means for maintaining said tripper means in disengaged relation comprising a third cam fast with said first-named cam, said first-named and second-named cams having operative connection for rotating said second-named cam a plurality of times for each revolution of said first-named cam, a main drive clutch, and a cam fast with said first-named cam for releasing said main drive clutch.

39. In speed changing mechanism, the combination of speed-change members comprising a movable member for causing change in relation thereof, a pair of arms for moving said movable member in opposite directions, a cam for moving each of said arms, and initiating means for each of said cams comprising a cam and releasing means therefor and automatically actuated means for effecting said release.

40. In speed changing mechanism, the combination of speed-change members comprising a movable member for causing change in relation thereof, a pair of arms for moving said movable member in opposite directions, a cam for each of said arms for moving the same, and initiating means for each of said cams comprising a cam and releasing means therefor and automatically actuated means for effecting said release, a main drive clutch, and a cam operative with each of said first-named cams for releasing said main drive clutch.

41. In speed changing mechanism, the combination of a driving element and a driven element, speed-change members, means for moving a member thereof embracing cam-mechanism having operative relation with said movable member and clutch-mechanism for said cam-mechanism having operative relation with one of said first-named elements, and means for automatically operating said clutch.

42. In power transmitting mechanism, the combination of a driving element, a driven element, a vibrator-frame operatively disposed between said elements, a train of gearing operatively disposed between said elements part of which is located on said vibrator-frame, speed-changing mechanism, and operative control for said speed-changing mechanism, movement wherein is initiated from said vibrator-frame, said operative control embracing electro-magnets and contacts therefor, the making and breaking whereof is controlled by said vibrator-frame.

In testimony whereof, we have signed our names hereto in the presence of two subscribing witnesses.

ARTHUR E. REUSS.
OSCAR SCHNITZLER.

Witnesses:
 EDWARD SOUTHWORTH,
 CHAS. E. WEBER.